United States Patent [19]

Bose et al.

[11] Patent Number: 4,654,275

[45] Date of Patent: Mar. 31, 1987

[54] STORAGE LIFE OF PB-IN-AG SOLDER FOIL BY SN ADDITION

[75] Inventors: Debasis Bose, Piscataway; Howard H. Liebermann, Succasunna, both of N.J.

[73] Assignee: Allied Corporation, Morris Township, Morris County, N.J.

[21] Appl. No.: 802,139

[22] Filed: Nov. 27, 1985

[51] Int. Cl.$^4$ .............................................. C22C 11/06
[52] U.S. Cl. ..................................... 428/606; 75/251; 420/563; 420/566; 420/570
[58] Field of Search ....................... 420/570, 566, 563; 148/403; 428/606; 228/263.12, 121, 122; 75/251; 164/463

[56] References Cited

U.S. PATENT DOCUMENTS

| | | | |
|---|---|---|---|
| 3,414,969 | 12/1968 | Blum et al. | 228/263.12 |
| 3,644,115 | 2/1972 | Hamaguchi et al. | 420/570 |
| 4,070,192 | 1/1978 | Arbib et al. | 420/570 |
| 4,209,570 | 6/1980 | DeCristofaro et al. | 428/606 |
| 4,512,950 | 4/1985 | Hosoda et al. | 420/570 |
| 4,517,027 | 5/1985 | Bickerdike et al. | 420/570 |

FOREIGN PATENT DOCUMENTS 105892  8/1981  Japan ................................ 420/570

OTHER PUBLICATIONS

"Solder for Low Temperature Soldering", Batrakov et al., *Chemical Abstracts*, vol. 82, article 47041x, p. 250.
"METGLAS Brazing Foil", DeCristofaro et al., *Welding Journal*, Jul. 1978, pp. 33-38.

*Primary Examiner*—L. Dewayne Rutledge
*Assistant Examiner*—John J. Zimmerman
*Attorney, Agent, or Firm*—Ernest D. Buff; Gerhard H. Fuchs

[57] ABSTRACT

A lead based, tin free alloy is modified by adding thereto about 0.5 to 4 weight percent of tin. The alloy is rapidly solidified by forming a melt thereof containing the tin addition and quenching the melt on a moving chill surface at a quenching rate of at least about $10^{5°}$ C./sec. Addition of the tin inhibits formation of lead oxide film in the rapidly solidified alloy and substantially increases the storage life thereof.

7 Claims, No Drawings

STORAGE LIFE OF PB-IN-AG SOLDER FOIL BY SN ADDITION

1. Field of the Invention

This invention relates to soldering of electronic components, and in particular, to a soldering alloy useful in soldering semiconductor devices to metal or ceramic parts.

2. Description of the Prior Art

Soldering is a process for metallurgical bonding of material, often of dissimilar compositions, to each other. Typically, a filler metal that has a melting point lower than that of the base material parts to be joined together is interposed between the metal parts to form an assembly. The assembly is then heated to a temperature sufficient to melt the filler metal. Upon cooling, a sound, leak-tight joint is formed.

The process of soldering is usually employed for joining a transistor or other semiconductor device (called die or chip) to a metal or ceramic part (called lead frame) to provide support to the device. This operation is commonly referred to as die attachment. When the device is in use, it generates heat which is transferred to the lead frame through the soldered joint. The joint, therefore, has to be sound and void-free to dissipate heat efficiently. In addition, very frequently the devices are repeatedly turned on and off, thereby creating thermal stresses in the soldered joint. Ideally, the joint should be chemically homogeneous to withstand such stresses. Segregation of intermetallic compounds in the joint oftentimes leads to failure when thermal cycling is subsequently imposed, resulting in permanent damage to the device.

One of the solder alloys commonly used for die attachment has the composition 92.5 Pb—5 In—2.5 Ag (wt%). Joints made using this alloy are strong and have adequate resistance against thermal fatigue. Commonly, this alloy is used in foil or wire form. One of the problems with the use of such a foil is its limited shelf life. Auger Electron Sectroscopy (AES) of an aged foil sample of composition 92.5 Pb—5 In—2.5 Ag showed the presence of a lead oxide film, which may not dissociate during soldering, and thereby inhibit wetting,. In contrast, a film of indium oxide, which breaks down easily during soldering, was found in freshly-made foil of the same composition.

There remains a need in the art for a modified 92.5 Pb—5 In—2.5 Ag solder composition having a strength comparable to but shelf life longer than that of the basic 92.5 Pb—5 In—2.5 Ag alloy.

SUMMARY OF THE INVENTION

The present invention provides a metallic alloy suitable for die attachment and having a joint strength comparable to, but shelf life longer than, that of the basic 92.5 Pb—5 In—2.5 Ag alloy. It has been found that the addition to lead based, tin free alloys of from 0.5 to 4 weight percent tin prior to rapid solidification thereof inhibits formation of lead oxide film in the alloys and thereby substantially increases the storage life thereof. Preferably, the alloys of the present invention contain essentially about 2 to 3 wt. % Ag, about 4.5 to 5.5 wt. % In, about 0.5 to 4.0 wt. % Sn, with the balance essentially Pb and incidental impurities. The mechanical properties of solder joints made with an alloy of the present invention are comparable to those of joints made with the basic 92.5 Pb—5 In—2.5 Ag (wt.%) alloy. In addition, the shelf life of a solder foil made from one of the alloys of the present invention is increased by about six fold, as determined from accelerated aging tests. Since the alloys of the present invention contain substantial amounts of Ag (2 to 3 wt.%), In (4.5 to 5.5 wt.%) and Sn (about 0.5 to 4.0 wt.%), which have limited solid solubility in Pb, solidification of the molten metallic alloys of the present invention at conventional cooling rates results in extensive chemical segregation. The resultant large segregated particles, identified to be $Ag_9In_4$ and $Ag_3Sn$ are expected to be present in conventional foils or preforms. Solder foils with such a segregated structure require a higher temperature, which may damage the silicon chip and/or a longer time to reflow than microstructurally homogeneous solder foil. Thus, conventional solder foil requires the use of a higher soldering temperature, which may damage the silicon chip, and/or a longer soldering time, which reduces the production rate. Ideally, therefore, the solder foil should be microstructurally homogeneous. The preferred method of producing microstructurally homogeneous foils from the alloys of the present invention is that of rapid solidification on a moving chill surface. Foils produced in this manner are microcrystalline and therefore chemically homogeneous. Other techniques such as (1) rolling (2) casting (3) powder metallurgical techniques or (4) drawing can be used to fabricate these alloys into foil or wire form. The alloys of the present invention can also be produced in powder form by melt atomization or by mechanical communition of a foil composed thereof.

In addition, the invention provides a process for joining together two or more parts comprising the steps of:

(a) interposing a filler metal foil between the parts to be joined to form an assembly, the filler metal foil having a melting temperature less than that of any of the parts to be joined;

(b) heating the assembly to at least the melting temperature of the filler metal, and cooling the assembly, wherein the improvement comprises employing as the filler metal at least one rapidly solidified foil composed of a high order alloy that is lead based and contains about 0.5 to 4 weight percent tin.

Alternatively, the joining operation can be performed by a process comprising the steps of:

(a) placing a filler metal on one of the parts to be joined to form as assembly, the filler metal having a melting temperature less than that of any of the parts to be joined;

(b) heating the assembly to at least the melting temperature of the filler metal;

(c) placing a second of the parts to be joined on the molten filler metal; and (d) cooling the assembly, the filler metal being at least one rapidly solidified foil produced by the process described in the preceding paragraph.

DETAILED DESCRIPTION OF THE INVENTION

A solder alloy of composition 92.5 Pb—5 In—2.5 Ag (wt.%) is commonly used for die attachment. Foils produced from this alloy typically have a shelf life of about 15 to 30 days when stored in air. AES of a freshly-produced foil of this composition showed the presence of indium oxide on the foil surface. Indium oxide can easily dissociate at soldering temperatures, resulting in good bonding of the silicon die with the substrate. However, AES of an aged foil showed the presence of lead oxide on the foil surface, indicating that oxygen can migrate through indium oxide and react with lead to form lead oxide. When lead oxide forms, these foils cease to wet the substrate of the die since lead oxide is difficult to dissociate at the soldering temperature.

The present invention provides rapidly solidified alloys having a substantially improved shelf life over alloys composed of 92.5 Pb—5 In—2.5 Ag, the improvement being accomplished by the addition of Sn to a lead based, tin free alloy.

In addition, the invention provides a process for fabricating a homogeneous, ductile foil comprising the steps of: (a) adding to an alloy that is lead based and tin free about 0.5 to 4 weight percent of tin; (b) forming a melt of the composition containing the tin addition; and (c) quenching the melt on a moving chill surface at a quenching rate of at least about $10^{5°}$ C./sec, the addition of the tin being operative to inhibit formation of lead oxide film in the alloy and to thereby substantially increase the storage life thereof. Preferably, stated, the alloys of the present invention contain essentially of about 2 to 3 wt.% Ag, about 4.5 to 5.5 wt.%. In, about 0.5 to 4.0 wt.% Sn, the balance being Pb and incidental impurities. The improvement of wetting behavior is attributed to possible formation of a tin oxide film on the surface of alloy foils of the present invention. It is believed that tin oxide reduces the migration of oxygen into the foil, thereby delaying the formation of a detrimental lead oxide film on the foil surface. In addition, tin oxide is easily dissociated at the soldering temperature, which results in improved solder wetting behavior.

The solid solubility of Sn in the basic Bal Pb—5 In—2.5 Ag (wt.%) composition was found to be about 1.5 wt.%. Hence, the preferred composition of the alloys of the present invention is 91 Pb—5 In—2.5 Ag—1.5 Sn (wt.%). When a foil produced from the preferred composition of the present invention is used for die attachment, the resultant joint is not expected to contain Sn-rich intermetallic compounds. Elimination of the formation of such brittle intermetallic compounds is expected to improve joint mechanical properties.

Additionally, in any soldering process, particularly when used for die attachments, the soldering foil should preferably be chemically homogeneous and should be free of any organic contaminants. The term "chemically homogeneous", as used herein with respect to the soldering foil of the invention, means that all individual phases within the foil having a composition different from the matrix are smaller than about 0.5 micrometer. More generally stated, the term "chemically homogeneous" means that the foil, as produced, is of substantially uniform composition in all directions. A chemically homogeneous soldered joint is achievable when the foil used for soldering is chemically homogeneous. Soldered joints should also be sound, i.e., should be free of voids and pores. A sound, chemically homogeneous soldered joint exhibits superior mechanical properties, compared to a joint which contains voids and which is chemically inhomogeneous. Generally, the soldering foils are produced by conventional metalworking techniques, in which a billet or ingot is repeatedly rolled and annealed until the desired thickness of the foil is obtained. Intermetallic phases, segregated within the billet or ingot, are thus transferred to the final product. In addition, grease or oil commonly used as lubricants during metalworking gets entrapped in the foil. Therefore, foils produced by conventional metalworking techniques are usually chemically inhomogeneous and contain organic contaminants.

The soldering foils of the present invention are prepared by cooling a melt of the desired composition at a rate of about $10^{3°}$ C./sec., and preferably about $10^{5°}$ C./sec, through metallic alloy rapid quenching techniques, as discussed in U.S. Pat. No. 4,331,739. The purity of all compositions is that found in normal commercial practice.

EXAMPLE 1

Ribbons of about 3.175 mm (0.125") wide and about 13 to 76 m (about 0.0005 to 0.003 inch) thick were formed by squirting a melt of the particular composition, by overpressure of argon, onto a rapidly rotating chill wheel (surface speed about 1200 to 6000 ft/min). Homogeneous ribbons having compositions set forth in Table I were produced.

TABLE I

| Sample No. | Composition (wt. %) | | | |
|---|---|---|---|---|
| | Pb | In | Ag | Sn |
| 1 | 92.5 | 5.0 | 2.5 | 0 |
| 2 | 91.0 | 5.0 | 2.5 | 1.5 |

EXAMPLE 2

The liquidus and solidus temperatures of the ribbons mentioned in Table 1 were determined by Differential Scanning Calorimetry (DSC). About 20 mg of the individual samples were heated at a rate of about 20° C./min. The liquidus and solidus temperatures were determined from heating curves and are set forth in Table II below.

TABLE II

| Sample No. | Composition (wt. %) | Liquidus °C.(°F.) | Solidus °C.(°F.) |
|---|---|---|---|
| 1 | 92.5 Pb 5.0 In 2.5 Ag | 313(595) | 304(579) |
| 2 | 91.0 Pb 5.0 In 2.5 Ag 1.5 Sn | 307(585) | 296(565) |

Table II shows that the melting characteristics of Sample No. 2 alloy foil of the present invention is very similar to that of Sample No. 1 alloy foil.

EXAMPLE 3

Shelf life of ribbon lengths from Samples 1 and 2 was determined immediately after casting in the manner described below.

Small preforms were first cut from Sample No. 1 and Sample No. 2. The individual preform was then placed on an electroless Ni-plated TO-3 header substrate. A silicon die was then placed onto the preform. A thermocouple was connected to the header to monitor temperature. The assembly was then heated to about 400° C. under Ar-4% $H_2$ atmosphere using manual die bonding equipment. Heating time from room temperature to 400° C. was about 75 sec. The solder foil completely melted at 400° C. and formed a bond between the silicon die and the TO-3 header upon solidification. The bond integrity of the joint was determined by bending the header through 180°.

A good bond is defined when the silicon die cracks during bending while remaining adhered to the header. A bad bond is defined when the silicon die detaches from the header during bending. A bad bond is generally produced when the solder foil ceases to wet the header and the silicon die.

Solder joints were made with freshly cast ribbon of Sample No. 1 and Sample No. 2 and the bond integrity tested by bending the headers, as described above. The preforms were then stored in an oven at 100° C. up to six days, in 24 hr intervals. Joints were made using the 24 hr.-aged ribbons and bond integrity tested again. Results are set forth in Table III below.

TABLE III

| Aging Time (Hrs.) | Bond Integrity | |
|---|---|---|
| | Sample No. 1 | Sample No. 2. |
| 0 | good | good |
| 24 | bad | good |
| 48 | bad | good |
| 72 | bad | good |
| 106 | bad | good |
| 130 | bad | good |
| 154 | bad | bad |

As shown in Table III, the bond integrity of joints made with Sample No. 2 alloy foil of the present invention was good even after aging the foil in an oven at 100° C. for a total time of 130 hrs. This indicates that the wetting characteristics of Sample No. b 2 alloy foil of the present invention did not deteriorate in this accelerated aging test, for a total period of time of 130 hrs. On the contrary, joints made with Sample No. 1 alloy foil failed to make a good bond when the foil was aged for 24 hrs. at 100° C., thereby indicating a more rapid deterioration of its wetting behavior.

EXAMPLE 4

Shear strengths of solder joints made with Sample No. 2 alloy foil of the present invention was compared with those of joints made with Sample No. 1 alloy foil in the following manner. Joints were made in an identical manner as described in Example 3. The shear strength of these joints were determined as per MIL-STD-883C Method 2019.2. An average value of ten tests conducted for each sample is reported in Table IV below.

TABLE IV

| | Shear Strength MPa (Psi) |
|---|---|
| Sample No. 1 | 49.1 (7,126) |
| Sample No. 2 | 45.5 (6,603) |

Table IV shows that the shear strength of joints made with Sample No. 2 alloy foil of the present invention is comparable to that of joints made with Sample No. 1 alloy foil.

Having thus described the invention in rather full detail, it will be understood that such detail need not be strictly adhered to but that various changes and modifications may suggest themselves to one skilled in the art, all falling within the scope of the present invention so defined by the subjoined claims.

We claim:

1. In a rapidly solidified homogeneous lead based, tin free soldering alloy consisting essentially of about 2 to 3 weight percent silver and about 4.5 to 5.5 weight percent indium, the improvement comprising adding to said alloy from 0.5 to 4 weight percent tin to inhibit formation of lead oxide film in said alloy and thereby substantially increase the storage life thereof.

2. An alloy as recited in claim 1, having the form of a foil.

3. An alloy as recited in claim 2, wherein said foil is ductile.

4. An alloy as recited in claim 2, wherein said foil has a microcrystalline structure.

5. An alloy as recited in claim 1, having the form of a powder.

6. An alloy as recited in claim 1, having the form of a wire.

7. An alloy as recited in claim 1, having a composition consisting essentially of about 2.5 weight percent silver, about 5 weight percent indium and about 1.5 weight percent tin.

* * * * *